(12) United States Patent
Park et al.

(10) Patent No.: US 6,850,569 B2
(45) Date of Patent: Feb. 1, 2005

(54) EFFECTIVE MOTION ESTIMATION FOR HIERARCHICAL SEARCH

(75) Inventors: Seong-Mo Park, Taejon (KR); Ju-Hyun Park, Taejon (KR); Jin-Jong Cha, Taejon (KR); Han-Jin Cho, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 624 days.

(21) Appl. No.: 09/846,153

(22) Filed: Apr. 30, 2001

(65) Prior Publication Data

US 2002/0080880 A1 Jun. 27, 2002

(30) Foreign Application Priority Data

Dec. 21, 2000 (KR) .......................................... 2000-79534

(51) Int. Cl.[7] ................................................. H04N 7/12
(52) U.S. Cl. ................. 375/240.16; 382/236; 348/416.1
(58) Field of Search ........................ 375/240.16, 240.27, 375/240.19, 240.21, 240.24, 240.18; 348/416.1, 699; 382/232, 236, 240

(56) References Cited

U.S. PATENT DOCUMENTS

| | | | | |
|---|---|---|---|---|
| 5,706,059 A | * | 1/1998 | Ran et al. ..................... | 348/699 |
| 5,708,732 A | * | 1/1998 | Merhav et al. .............. | 382/232 |
| 6,208,692 B1 | * | 3/2001 | Song et al. ............ | 375/240.19 |
| 6,430,317 B1 | * | 8/2002 | Krishnamurthy et al. ... | 382/236 |
| 6,504,872 B1 | * | 1/2003 | Fimoff et al. .......... | 375/240.27 |
| 6,549,575 B1 | * | 4/2003 | Butter et al. ........... | 375/240.16 |
| 6,560,371 B1 | * | 5/2003 | Zhang et al. ................ | 382/240 |

* cited by examiner

Primary Examiner—Gims Philippe
(74) Attorney, Agent, or Firm—Seed IP Law Group PLLC

(57) ABSTRACT

In the present invention, a reference block data within a current image from which a motion vector will be obtained and corresponding search region data within reproduced previous image are stored in a reference block and a search region data memory, respectively. A motion vector of two pixels unit is performed using the reference block and the search region data stored in the memory, thus resulting in obtained a motion vector of two pixels unit. At this time, the reference block and the search region data are used by performing 2:1 sampling in a horizontal direction and a vertical direction, respectively and the search range is −7~+7. The structure of the motion search is consisted of a memory for storing a reference block (8×8) of current images and a memory (24×8) for storing a search region storing reproduced previous images. The structure further includes a processing element (PE) array block for obtaining SAD (sum of absolute difference) among candidate blocks within the search region and a block for obtaining the smallest motion vector among the candidate SADs. If hardware is implemented using the two-step search algorithm among the motion estimation of the present invention, a lot of data bandwidth of the reference memory and a memory having a large size are required. The down sampling scheme and the bandwidth of the reference memory has a structure in which a slice is previously downloaded before a pipeline when it downloads from the external memory. In an actual pipeline operation, it is implemented by the bandwidth of ⅓. Also, as it has independent memories, it can operate even at low frequency without degrading the performance.

6 Claims, 7 Drawing Sheets

FIG. 6

QCIF(11×9)
SEARCH REGION MEMORY WRITE MAP
PREFPELINE "A" WRITE,(0,0) PIPELINE "B" WRITE, OTHERS "C" WRITE
READ A->B->C

|   | 0 | 1 | 2 | 3 | 4 | 5 | 6 | 7 | 8 | 9 | 10 (NEXT ROW WRITE) |
|---|---|---|---|---|---|---|---|---|---|---|---|
| 0 | ABC | ABC | CAB | BCA | ABC | CAB | BCA | ABC | CAB | BCA | ABC |
| 1 | BCA | BCA | ABC | CAB | BCA | ABC | CAB | BCA | ABC | CAB | BCA |
| 2 | CAB | CAB | BCA | ABC | CAB | BCA | ABC | CAB | BCA | ABC | CAB |
| 3 | ABC | ABC | CAB | BCA | ABC | CAB | BCA | ABC | CAB | BCA | ABC |
| 4 | BCA | BCA | ABC | CAB | BCA | ABC | CAB | BCA | ABC | CAB | BCA |
| 5 | CAB | CAB | BCA | ABC | CAB | BCA | ABC | CAB | BCA | ABC | CAB |
| 6 | ABC | ABC | CAB | BCA | ABC | CAB | BCA | ABC | CAB | BCA | ABC |
| 7 | BCA | BCA | ABC | CAB | BCA | ABC | CAB | BCA | ABC | CAB | BCA |
| 8 | CAB | CAB | BCA | ABC | CAB | BCA | ABC | CAB | BCA | ABC | CAB |

EFFECTIVE MOTION ESTIMATION FOR HIERARCHICAL SEARCH

TECHNICAL FIELD

The invention relates generally to a motion estimation apparatus using a hierarchical search of compressed image data. More particularly, the invention relates to a motion estimation apparatus using a hierarchical search capable of improving the hardware area, the consumption power and the operating speed, by implementing a structure in which a memory band width can be minimized on a down sampling logic circuit and a pipeline.

BACKGROUND OF THE INVENTION

In case of image signals, they have a high correlation between neighboring screens. In order to increase the compression efficiency of image signals, redundant information existing on the time axis must be reduced. More particularly, as motion estimation among neighboring screens of image data requires a lot of computation amount, a lot of studies have been made on algorithm and hardware structures.

There is a conventional method of using a memory, as shown in FIG. 1. This method implements VLSI using a motion estimation algorithm. However, as this method necessitates additional memory, there are problems that a lot of area and a lot of consumption power are required.

In other words, the conventional motion estimation apparatus is consisted of a block 101 for receiving previous images of a search region from an external memory, a block 102 for receiving images of a current reference block from an external memory, a plurality of processing elements (PE) for obtaining a sum of absolute difference between the two input values, a comparator 103 for obtaining a minimum motion vector of output values from the plurality of processing elements, and an address generator 104 for generating addresses for next stage. The plurality of processing elements operate in parallel and each of the processing elements obtains a motion vector in different points, that is, different search regions.

That is, in the prior art, for motion search, a current image data and a previous image data is stored in the buffers (memories), respectively, which are used as an input of the processing elements (PE). At this time, however, as three memories must be used, there are problems that a lot of computation amount and hardware are required.

By adopting a two-step hierarchical search algorithm, the motion estimation module performs a motion search function by performing a ¼ sampling operation for a pixel data in the first step among two-step hierarchical search algorithm, and also performs motion estimation by receiving data of a reference block and data of a search region from the external memory.

In the present invention, a reference block data within a current image from which a motion vector will be obtained and corresponding search region data within reproduced previous image are stored in a reference block and a search region data memory, respectively. A motion vector of two pixels unit is performed using the reference block and the search region data stored in the memory, thus resulting in obtained a motion vector of two pixels unit. At this time, the reference block and the search region data are used by performing 2:1 sampling in a horizontal direction and a vertical direction, respectively and the search range is −7∼+7. The structure of the motion search is consisted of a memory for storing a reference block (8×8) of current images and a memory (24×8) for storing a search region storing reproduced previous images. The structure further includes a processing element (PE) array block for obtaining SAD (sum of absolute difference) among candidate blocks within the search region and a block for obtaining the smallest motion vector among the candidate SADs. If hardware is implemented using the two-step search algorithm among the motion estimation of the present invention, a lot of data bandwidth of the reference memory and a memory having a large size are required. The down sampling scheme and the bandwidth of the reference memory has a structure in which a slice is previously downloaded before a pipeline when it downloads from the external memory. In an actual pipeline operation, it is implemented by the bandwidth of ⅓. Also, as it has independent memories, it can operate even at low frequency without degrading the performance.

SUMMARY OF THE INVENTION

The present invention is contrived to solve the above problems and an object of the present invention is to provide a motion estimation apparatus using a hierarchical search capable of reducing the size of the memory and the area of the circuit and of reducing the power consumption, in such a way that down-sampled data of a search region is used, a memory is divided into three partial regions, a motion search is began with the data downloaded in one of the partial regions of the memory and data is downloaded onto the three partial regions of the memory while sequentially performing a motion search.

In order to accomplish the above object, a video image motion estimation apparatus including a processing element block for receiving a reference data and a current data to obtain a motion vector in which a sum of absolute difference between the two input values is minimized and a comparator according to the present invention is characterized in that it comprises a down sampling means for down-sampling the reference data and the current data, and a memory for respectively storing the down-sampled reference data and current data and then providing the data to the processing element block.

Also, a video image motion estimation apparatus including a processing element block for receiving a reference data and a current data to obtain a motion vector in which a sum of absolute difference between the two input values is minimized and a comparator according to the present invention is characterized in that it comprises a demultiplexer for separating an even column and an odd column of the reference data, an even column memory for storing an even column of the reference data and then providing the even column to the processing element block, an odd column memory for storing an odd column of the reference data and then providing the odd column to the processing element block, and a current memory for storing the current data and then providing the current data to the processing element block.

Further, a video image motion estimation method in a motion estimation apparatus including a processing element block for receiving a reference data and a current data to obtain a motion vector in which a sum of absolute difference between the two input values is minimized and a comparator according to the present invention is characterized in that it comprises a down sampling step of down-sampling the reference data and the current data, and a memory step of respectively storing the down-sampled reference data and current data and then providing the data to the processing element block.

Further, a video image motion estimation method in a motion estimation apparatus including a processing element block for receiving a reference data and a current data to obtain a motion vector in which a sum of absolute difference between the two input values is minimized, and a comparator according to the present invention is characterized in that it comprises a demultiplexing step of separating an even column and an odd column of the reference data, and a memory step of individually storing even columns and odd columns of the reference data and the current data and then providing them to the processing element block.

In the present invention, a reference block data within a current image from which a motion vector will be obtained and corresponding search region data within reproduced previous image are stored in a reference block and a search region data memory, respectively. A motion vector of two pixels unit is performed using the reference block and the search region data stored in the memory, thus resulting in obtained a motion vector of two pixels unit. At this time, the reference block and the search region data are used by performing 2:1 sampling in a horizontal direction and a vertical direction, respectively and the search range is −7~+7.

BRIEF DESCRIPTION OF THE DRAWINGS

The aforementioned aspects and other features of the present invention will be explained in the following description, taken in conjunction with the accompanying drawings, wherein:

FIG. 6 is a detailed processing element array according to the present invention.

DETAILED DESCRIPTION OF THE INVENTION

The present invention will be described in detail by way of a preferred embodiment with reference to accompanying drawings.

Figure 1:
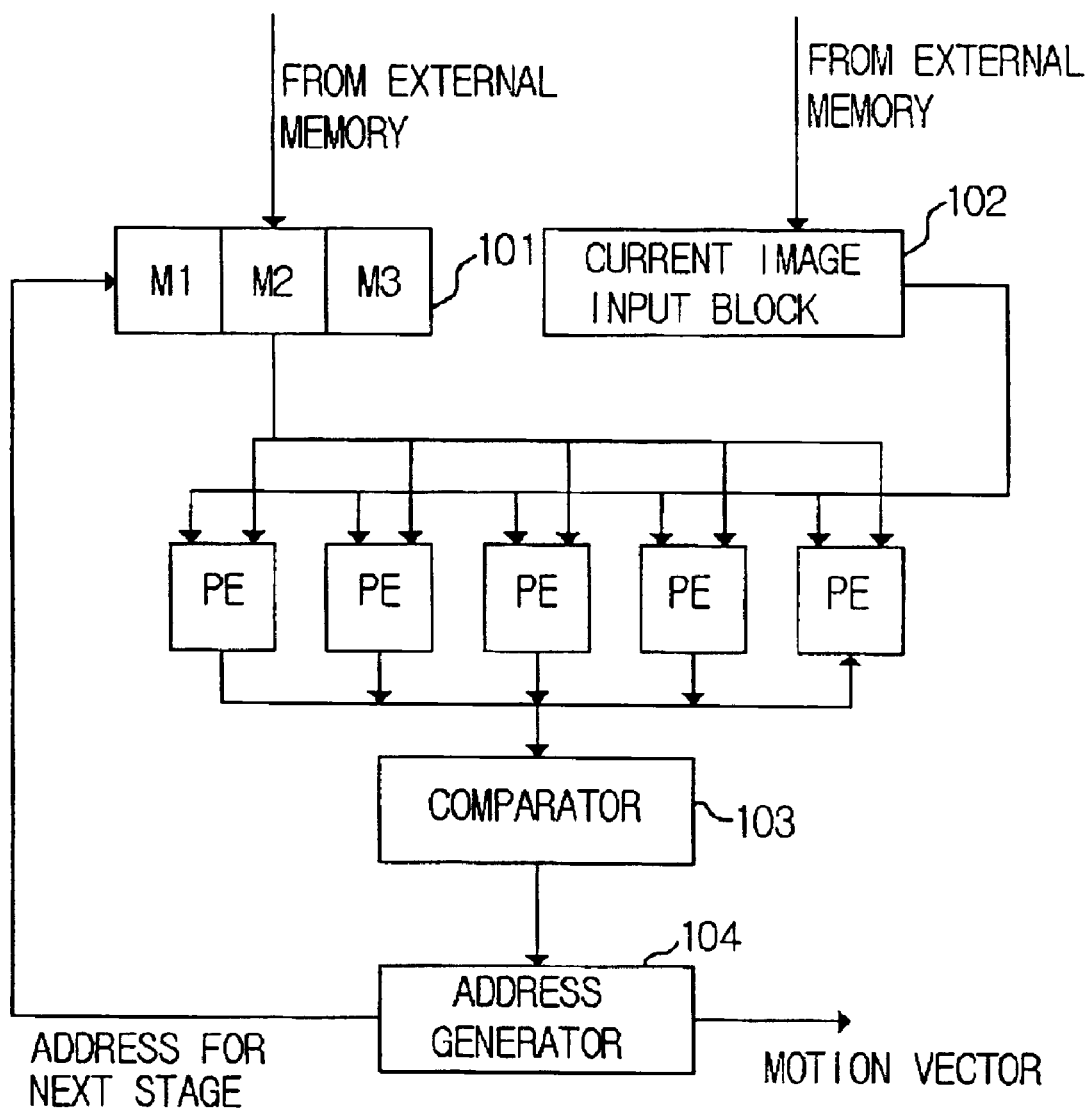
FIG. 1 is a structural block diagram of a motion estimation apparatus using a conventional hierarchical search.
Figure 2:
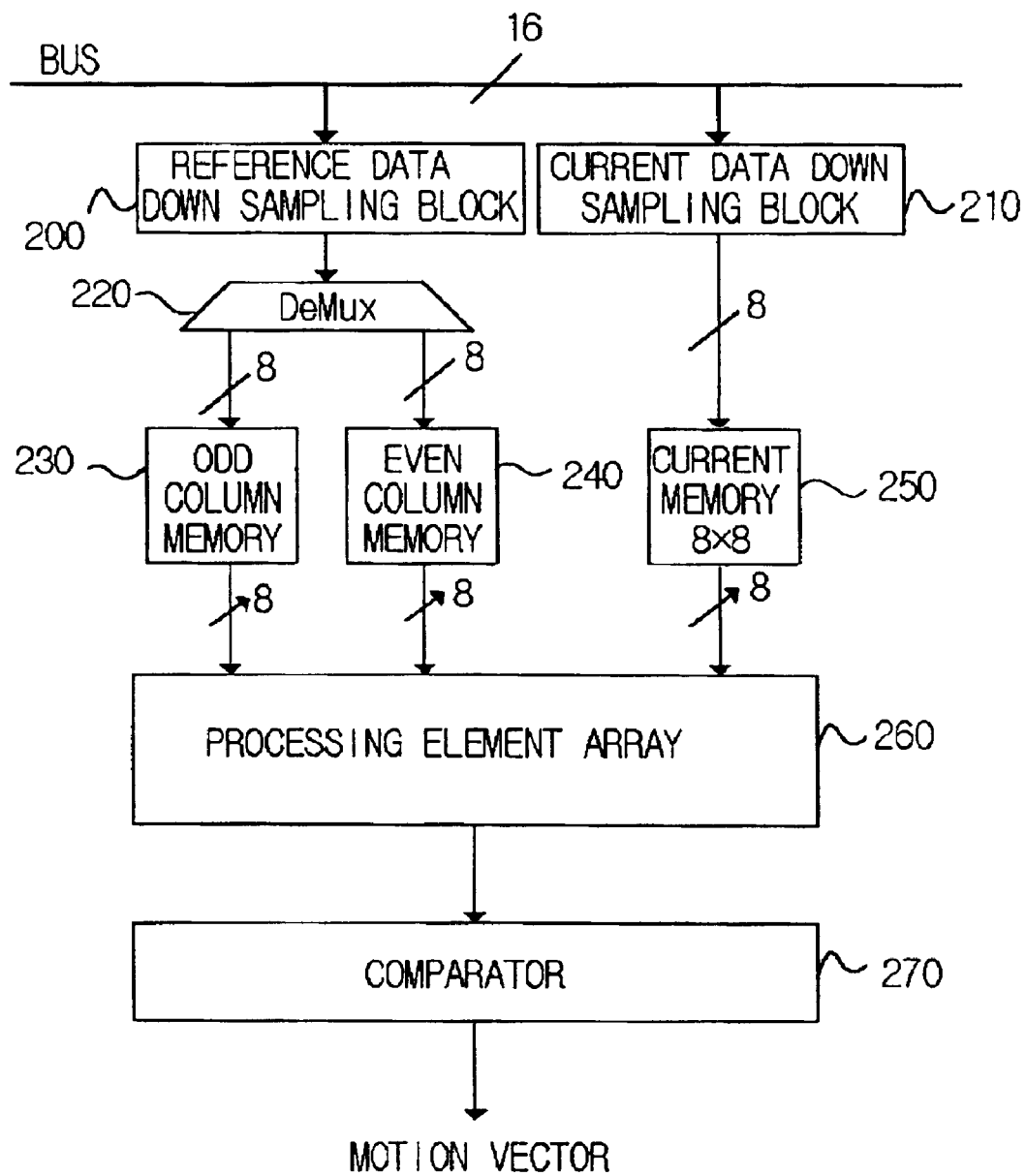
FIG. 2 is a structural block diagram of a motion estimation apparatus using a hierarchical search according to one embodiment of the present invention.

Referring now to FIG. 2, a motion estimation apparatus hierarchical search according to the present invention will be explained in detail.

The motion estimation apparatus includes a block 200 for receiving a reference data from an external memory to perform a reference data down sampling, a block 210 for receiving a current data from an external memory to perform a current data down sampling, a demultiplex block 220 for separating the down sampled reference data into even columns and add columns, a single memory block 250 for storing the down sampled current data, two reference memory blocks 230 and 240 for respectively storing the even columns and the add columns of the reference data separated by the demultiplexe block 220, a processing element array 260 consisted of eight processing elements, and a comparator 270 for obtaining a minimum motion vector among the output values from the processing element array 260.

Figure 3:
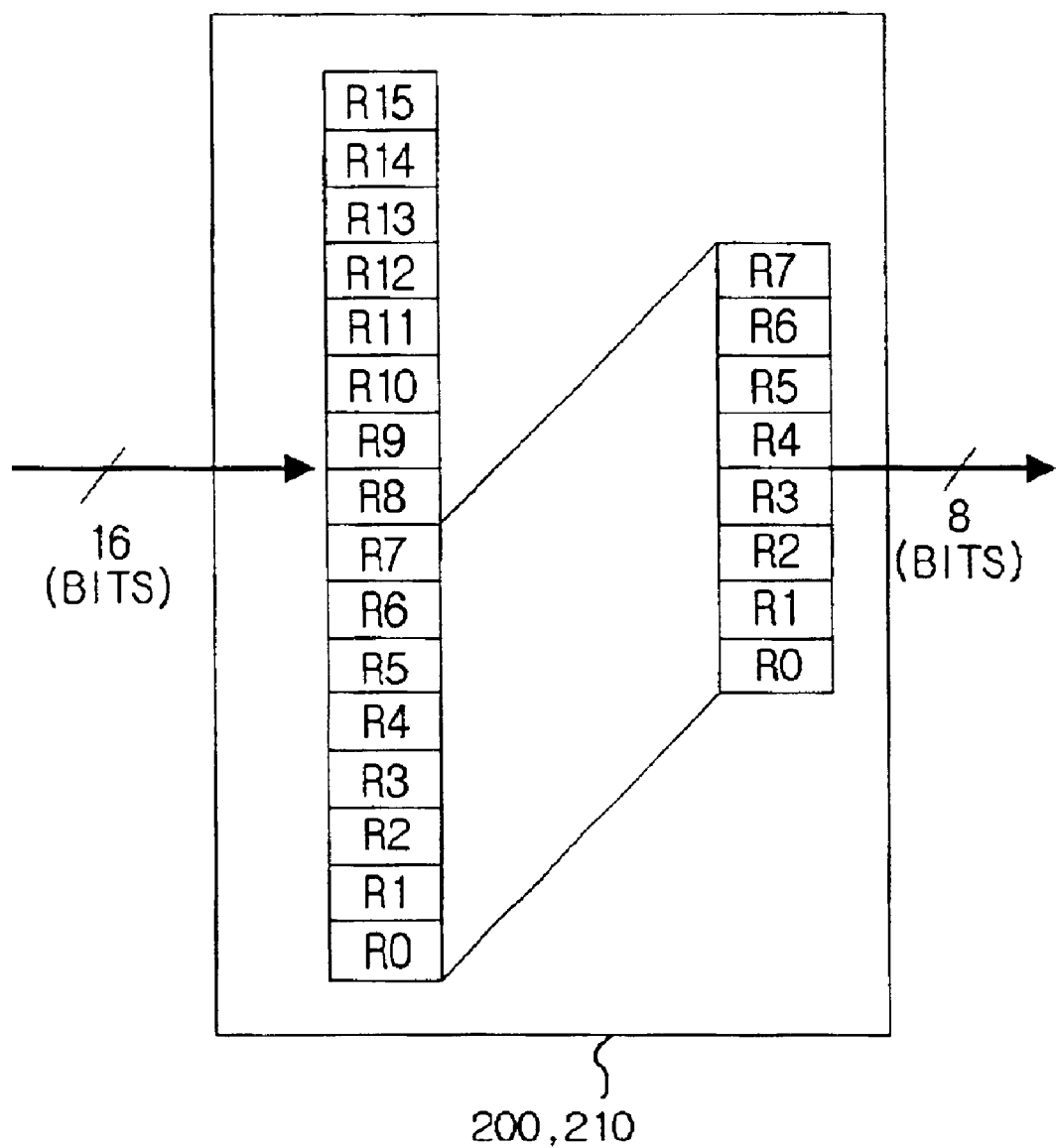
FIG. 3 is a detailed down sampling block according to the present invention.

FIG. 3 is a detailed down sampling block 200 and 210. The sampling block down-samples the input data by 2:1 by selecting only lower bits among 16 bit data for hierarchical search.

Figure 4:
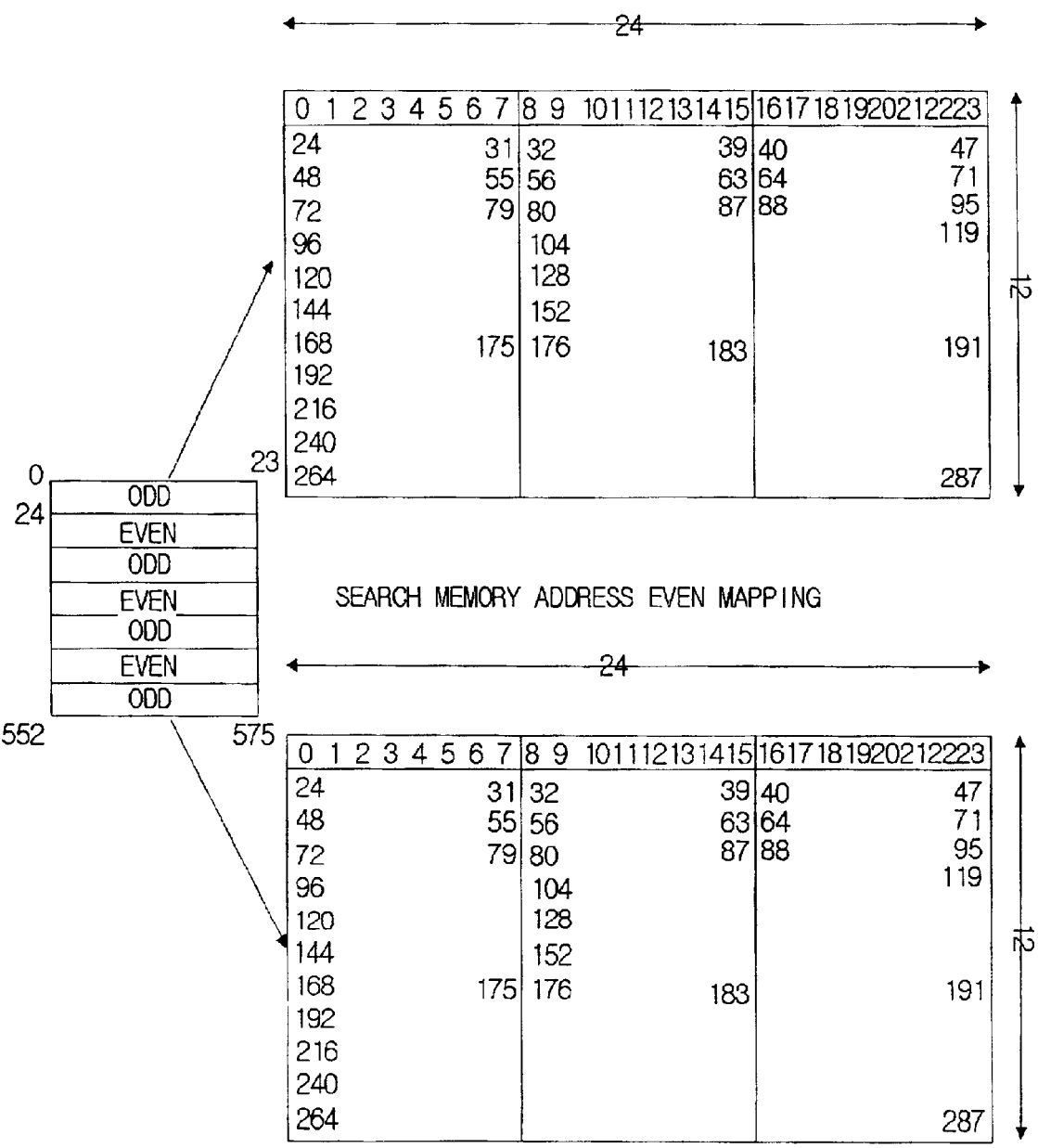
FIG. 4 shows a memory map of a search region according to the present invention.

FIG. 4 is a map for the reference data memory. The map stores the reference memory using two memories, wherein add column data is stored in one memory and even column data is stored in another memory. By doing so, two data having the reference clock and the same speed are stored in the processing element, which will be explained later, so that the processing element can be used by 100%. At this time, the size of the memory is 24×12 ad the memory for the current image is 8×8 size.

Figure 5A:
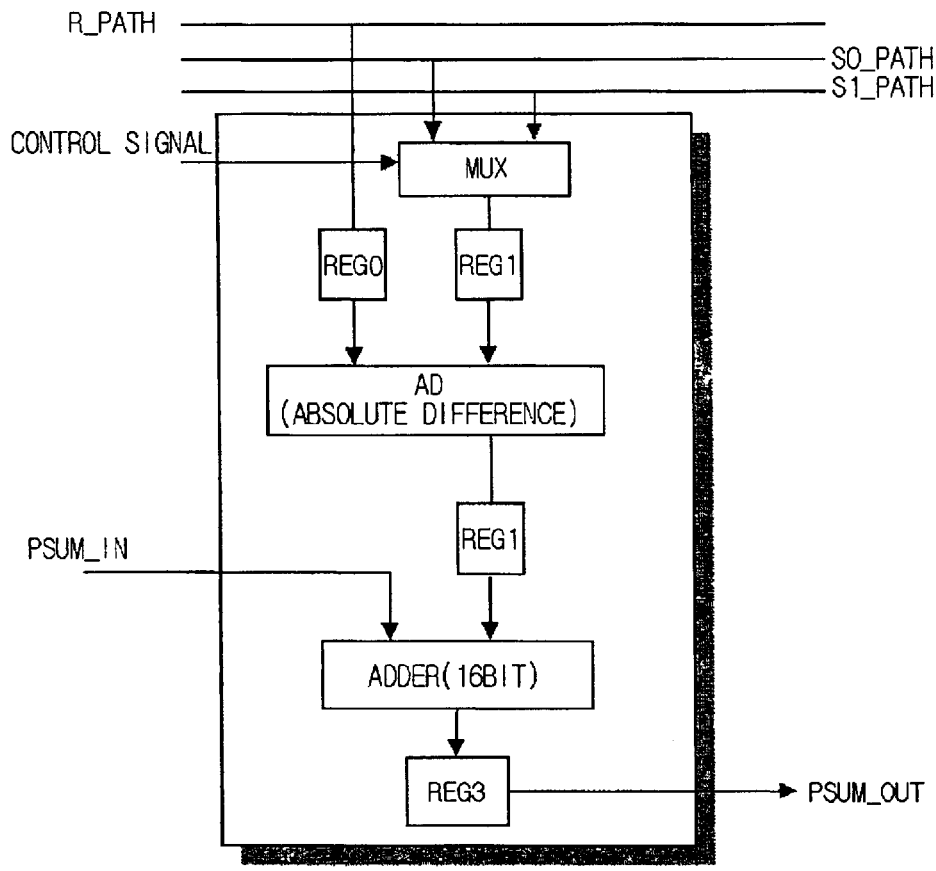
FIG. 5 shows a memory map of a frame unit in a search region according to the present invention.
Figure 5B:
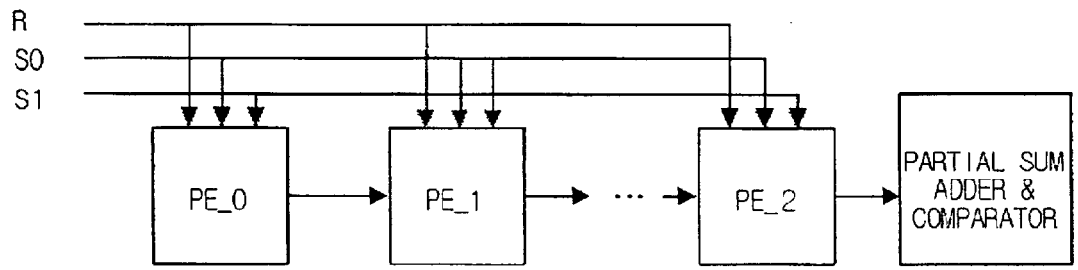

FIG. 5 is a construction of the processing element. The number of the processing element necessary for motion estimation is eight (8) and has a systolic array structure. This structure is regular and has a high operating speed. Also, data can be easily provided and the input speed of data is low. Therefore, it can be implemented in a pipeline and parallel structure.

This type of processing element has three inputs, which includes one reference input and two search inputs. An internal processing element, being a systolic array structure, can be used by 100% except for an initial time. In the drawing, (a) is a construction of a single processing element and (b) is a construction in which eight processing elements are serially connected.

FIG. 6 shows a write map of a reference data memory in case of QCIF. That is, the memory is divided into three slices. In the present invention, in order to minimize the bandwidth of the memory, the bandwidth necessary for the current pipeline is only 24×8 pixel data corresponding to ⅓ size of the memory.

Data necessary for a macro block (0,0) position requires two slices, that is, A and B data as the reference data. Therefore, before the pipeline starts, one slice is downloaded. If the pipeline begins, that is, only the reference data corresponding to the B slice is downloaded in the macro block (0,0) position. Then, only the reference data corresponding to the C slice is downloaded in the remaining macro blocks except for the (0,0) position. When the reference data is read from this memory, slices A, B and C are sequentially read. This structure can reduce the external memory and necessary data bandwidth by ⅓.

Figure 7:
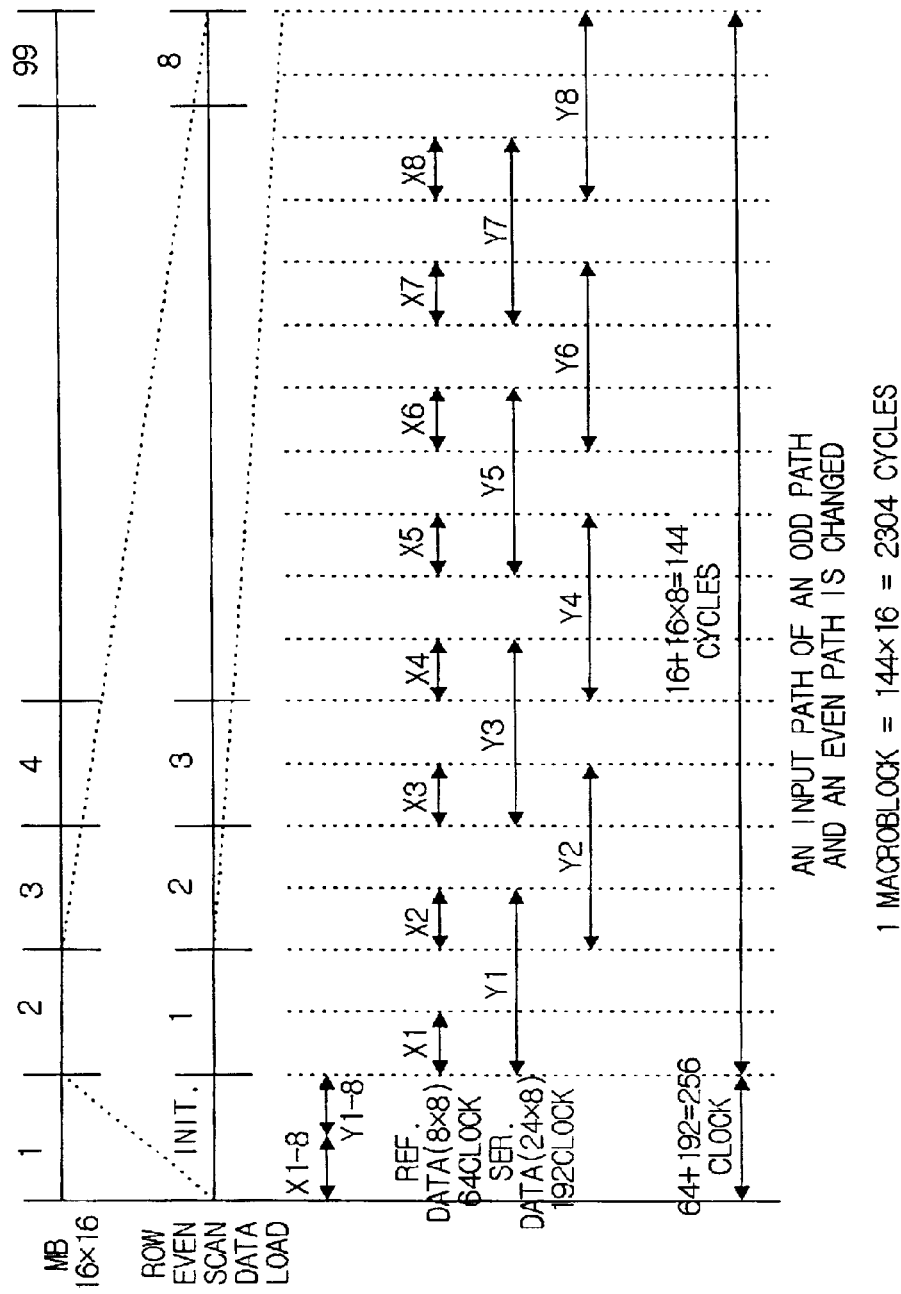
FIG. 7 is a flowchart of data to which the present invention is applied.

FIG. 7 is a flowchart of data to which the present invention is applied. The cycle necessary for downloading the reference image by necessary cycle number for the QCIF image is 24×8=192clocks.

As mentioned above, according to the present invention, the memory for storing the down sampling scheme and the reference data when they are downloaded from an external memory, has a structure in which slices are previously downloaded before the pipeline. Thus, the present invention can implement the memory by the bandwidth of ⅓ in an actual pipeline operation. Further, as the reference data memory has independent memories, the present invention can implement a circuit even at a low frequency without degradation of the performance. Also, as the implemented circuit operates with a less bandwidth and at a low frequency, the present invention can reduce the power consumption.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any and all such applications, modifications, and embodiments within the scope of the present invention.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed:

1. A video image motion estimation apparatus including a processing element block for receiving a reference data and a current data to obtain a motion vector in which a sum of absolute difference between the two input values is minimized, and a comparator, comprising:
   a down sampling means for down-sampling said reference data and said current data,
   a demultiplexer for separating an even column data and an odd column data of the down-sampled reference data,
   an even column memory for storing even column data and providing the even column data to the processing element block,
   an odd column memory for storing odd column data and providing the odd column data to the processing element block, and
   a current memory for storing current data and providing the current data to the processing element block,
   wherein the processing element block comprises a number of processing elements, each processing element receiving the even column data, the odd number data, and the current data simultaneously and connected with each other with a systolic array structure,
   wherein said even column memory and said odd column memory each are divided into n number of column blocks (n being a natural number over 2), a reference data corresponding to 1/n among the column data are sequentially written into each of said column blocks per motion estimation, wherein the reference data in the column block firstly written is updated with a new column data, and the reference data stored in each of the column blocks in the memory are sequentially read in the order in which they were written, and then provided to the processing element block.

2. The motion estimation apparatus according to claim 1, wherein said down sampling means performs a down sampling operation by 2:1 by selecting only lower n/2 bits among n (a multiple of 2) bit input data.

3. The motion estimation apparatus according to claim 1, wherein a means for down-sampling said reference data and a means for down-sampling a current data are individually separated.

4. A video image motion estimation method in a motion estimation apparatus including a processing element block for receiving a reference data and a current data to obtain a motion vector in which a sum of absolute difference between the two input values is minimized, and a comparator, comprising the steps of:
   down-sampling said reference data and said current data,
   separating an even column data and an odd column data of the down-sampled reference data,
   respectively storing the even column data, the odd column data, and the current data to a separate memory, and
   providing the even column data, the odd column data, and the current data stored in the separate memory to the processing element block, and
   wherein the storing step including the steps of: dividing the memory for storing the even column data and the odd column data into n number of column blocks (n is a natural number over 2) and sequentially writes a reference data corresponding to 1/n among the column data per a motion estimation into each of said column blocks, wherein the reference data in the column block firstly written is updated with a new column data, wherein the reference data stored in each of the column blocks in said memory is sequentially read in the order in which they were written, and then provided to said processing element block.

5. The video image motion estimation method according to claim 4, wherein said down sampling step performs a down sampling operation by 2:1 by selecting only lower n/2 bits among n (a multiple of 2) bit input data.

6. The video image motion estimation method according to claim 4, wherein the down sampling of said reference data and the down sampling of said current data are individually performed.

* * * * *